United States Patent
Zou et al.

(10) Patent No.: US 9,910,548 B2
(45) Date of Patent: Mar. 6, 2018

(54) ON-CELL TOUCH DISPLAY PANEL WITH TOUCH STRUCTURE ARRANGED ON OUTERMOST SURFACE OF COLOR FILTER SUBSTRATE AND DISPLAY DEVICE

(71) Applicant: BOE TECHNOLOGY GROUP CO., LTD., Beijing (CN)

(72) Inventors: Xiangxiang Zou, Beijing (CN); Jianing Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 14/888,279

(22) PCT Filed: Jan. 26, 2015

(86) PCT No.: PCT/CN2015/071531
§ 371 (c)(1),
(2) Date: Oct. 30, 2015

(87) PCT Pub. No.: WO2016/070499
PCT Pub. Date: May 12, 2016

(65) Prior Publication Data
US 2016/0342240 A1    Nov. 24, 2016

(30) Foreign Application Priority Data

Nov. 6, 2014  (CN) .......................... 2014 1 0643461

(51) Int. Cl.
*G06F 3/044*  (2006.01)
*G06F 3/041*  (2006.01)

(52) U.S. Cl.
CPC .............. *G06F 3/044* (2013.01); *G06F 3/041* (2013.01)

(58) Field of Classification Search
CPC ............................................. G06F 3/041–3/047
See application file for complete search history.

(56) References Cited

U.S. PATENT DOCUMENTS

2009/0278813 A1* 11/2009 Wijaya .................... G06F 3/041
                                                                345/173
2013/0044074 A1*  2/2013 Park .................... G02F 1/13338
                                                                345/174

(Continued)

FOREIGN PATENT DOCUMENTS

CN        102455831 A      5/2012
CN        103558937 A      2/2014

(Continued)

OTHER PUBLICATIONS

First Office Action regarding Chinese application No. 201410643461.0, dated Oct. 9, 2016. Translation provided by Dragon Intellectual Property Law Firm.

(Continued)

*Primary Examiner* — Sanghyuk Park
(74) *Attorney, Agent, or Firm* — Harness, Dickey & Pierce, P.L.C.

(57) ABSTRACT

The present disclosure provides a touch display panel and a display device including the touch display panel. The touch display panel includes a display panel, a touch layer and a touch driving circuit board. The display panel includes an array substrate and a color filter substrate arranged opposite to the array substrate to form a cell. The touch layer is arranged at an outer surface of the color filter substrate away from the array substrate, an electrode at the touch layer is connected to a wire through a conductor penetrating through the color filter substrate, and the wire is connected to the touch driving circuit board.

20 Claims, 5 Drawing Sheets

(56) References Cited

U.S. PATENT DOCUMENTS

2014/0184940 A1* 7/2014 Ma ...................... G02F 1/13338
349/12
2014/0184942 A1* 7/2014 Bang .................. G02F 1/13338
349/12

FOREIGN PATENT DOCUMENTS

CN 104020906 A 9/2014
CN 104035624 A 9/2014
CN 204087160 U 1/2015

OTHER PUBLICATIONS

Written Opinion of the International Searching Authority for international application No. PCT/CN2015/071531.

* cited by examiner

ON-CELL TOUCH DISPLAY PANEL WITH TOUCH STRUCTURE ARRANGED ON OUTERMOST SURFACE OF COLOR FILTER SUBSTRATE AND DISPLAY DEVICE

CROSS-REFERENCE TO RELATED APPLICATIONS

The present application is the U.S. national phase of PCT Application No. PCT/CN2015/071531 filed on Jan. 26, 2015, which claims a priority of the Chinese patent application No. 201410643461.0 filed on Nov. 6, 2014. The entire disclosures of both of which are incorporated herein by reference in their entirety.

TECHNICAL FIELD

The present disclosure relates to the field of liquid crystal display, in particular to a touch display panel and a display device.

BACKGROUND

Touch display panel, also called as "touch panel", is an inductive liquid crystal display device capable of receiving a signal from a contact point. Usually, the touch display panel includes a display panel and a touch layer arranged at a surface of the display panel. Depending on its operating principles and media for transmitting information, the touch layer includes a resistive touch layer, a capacitive touch layer, an infrared touch layer and a surface acoustic wave touch layer. The capacitive touch layer operates by sensing a current from a human body. When a user touches a surface of the touch layer, a coupling capacitance is generated between a user's finger and a working surface. A high-frequency signal is applied to the working surface, so a very tiny current is absorbed by the finger, and this current flows, in four parts, out from four electrodes arranged at four corners of the panel, respectively. Then, a proportion of these four parts of the current is calculated by a controller so as to obtain a touch position.

As shown in FIG. 1, in an existing single-layered capacitive touch layer, the electrodes (usually including transmitting electrodes 1 and sensing electrodes 2) and their wires 3 are arranged at an identical layer. The wires of a plurality of electrodes gather together at a region where fewer electrodes are arranged, so a touch dead zone 4 may occur. As a result, a touch performance of the touch layer as well as a resultant display effect will be adversely affected.

SUMMARY

An object of the present disclosure is to provide a touch display panel and a display device, so as to prevent the occurrence of a touch dead zone when wires gather together.

In one aspect, the present disclosure provides in one embodiment a touch display panel including a display panel, a touch layer and a touch driving circuit board. The display panel includes an array substrate and a color filter substrate arranged opposite to the array substrate to form a cell. The touch layer is arranged at an outer surface of the color filter substrate away from the array substrate, an electrode at the touch layer is connected to a wire through a conductor penetrating through the color filter substrate, and the wire is connected to the touch driving circuit board.

Alternatively, the color filter substrate includes a base substrate in which a via-hole is provided, and the conductor is connected to the wire through the via-hole.

Alternatively, one end of the via-hole is arranged opposite to the electrode at the touch layer, and the other end of the via-hole is arranged opposite to a black matrix on the color filter substrate.

Alternatively, a projection of the wire onto the color filter substrate in a perpendicular direction is located within a projection of the black matrix onto the color filter substrate in a perpendicular direction.

Alternatively, the touch driving circuit board is arranged at an inner surface of the color filter substrate facing the array substrate, a display driving circuit board of the display panel is arranged on the array substrate, and the wire is arranged at an inner surface of the color filter substrate.

Alternatively, the wire is a metal wire.

Alternatively, the color filter substrate and the array substrate are adhered to each other in an offset manner, the inner surface of the color filter substrate includes a first opposing region corresponding to the array substrate and a first non-opposing region offset from the array substrate, the touch driving circuit board is arranged at the first non-opposing region, the inner surface of the array substrate includes a second opposing region corresponding to the color filter substrate and a second non-opposing region offset from the color filter substrate, and the display driving circuit board is arranged at the second non-opposing region.

Alternatively, the wire is connected to a pad which is connected to the touch driving circuit board.

Alternatively, the touch driving circuit board and the display driving circuit board of the display panel are both arranged on the array substrate.

Alternatively, the wire is connected to a gold ball which is connected to the touch driving circuit board on the array substrate.

Alternatively, the touch driving circuit board and the display driving circuit board are integrated into a circuit board which is arranged on the array substrate.

Alternatively, the touch driving circuit board is arranged at the outer surface of the color filter substrate away from the array substrate, the display driving circuit board of the display panel is arranged on the array substrate, and the wire is connected to the touch driving circuit board on the color filter substrate after penetrating through the color filter substrate.

In another aspect, the present disclosure provides in one embodiment a display device including the above-mentioned touch display panel.

According to the embodiments of the present disclosure, the electrodes (including transmitting electrodes and sensing electrodes) at the touch layer are connected to the wires through the conductors penetrating through the color filter substrate, and the wires are connected to the touch driving circuit board. In this way, the electrodes and the wires are not arranged at an identical layer and the wires do not gather together, so no touch dead zone occurs at the touch layer. In terms of the touch performance, it is able to remarkably improve the touch accuracy due to the absence of touch dead zone.

DETAILED DESCRIPTION

In order to make the objects, the technical solutions and the advantages of the present disclosure more apparent, the present disclosure will be described hereinafter in conjunction with the drawings and embodiments. Obviously, the following embodiments are for illustrative purposes only, but shall not be used to limit the scope of the present disclosure.

The present disclosure provides in one embodiment a touch display panel, so as to prevent the occurrence of a touch dead zone, thereby to improve the touch performance and achieve the single-layered, multi-point touch.

First Embodiment

Figure 1:
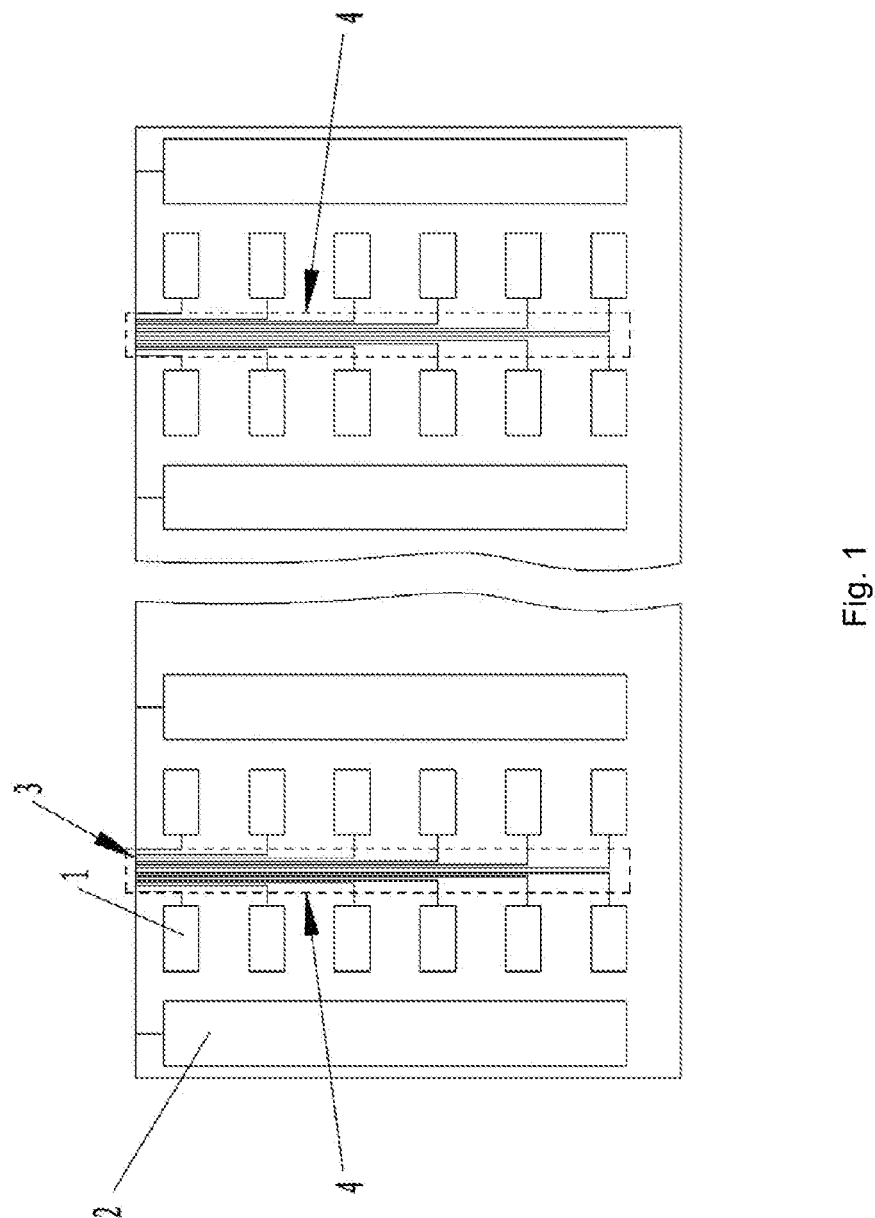
FIG. 1 is a top view of an existing touch display panel.
Figure 2:
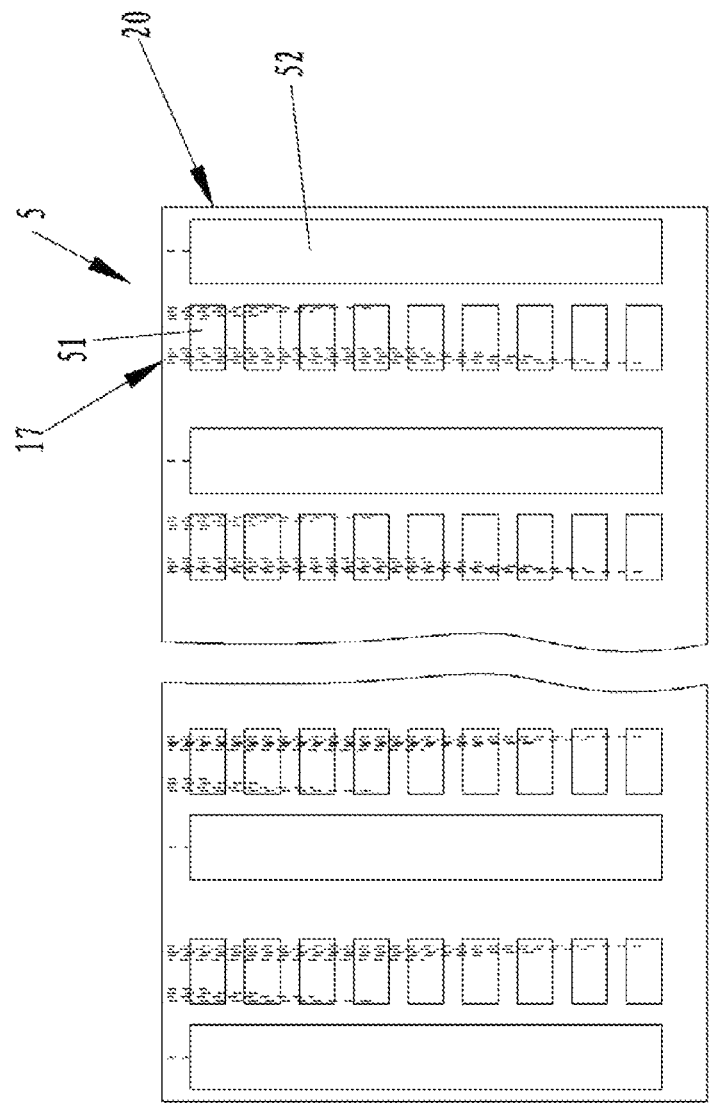
FIG. 2 is a partial top view of a touch display panel according to the first embodiment of the present disclosure.
Figure 3:
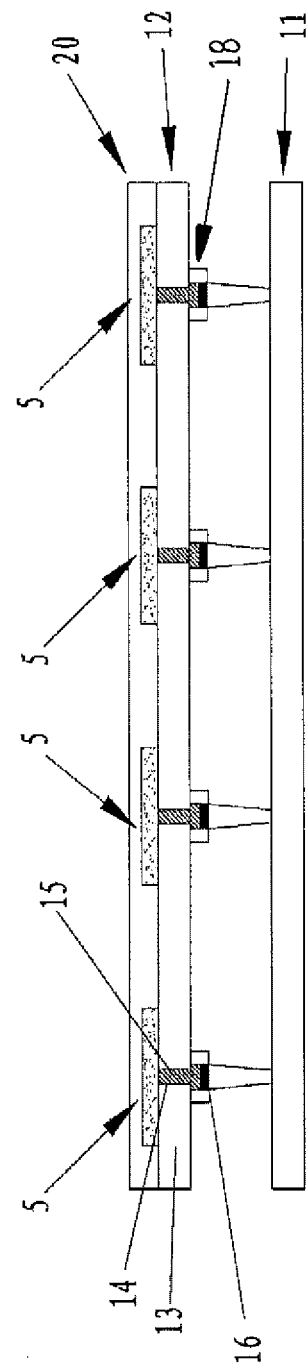
FIG. 3 is a partial sectional view of the touch display panel according to the first embodiment of the present disclosure.
Figures 4, 5:
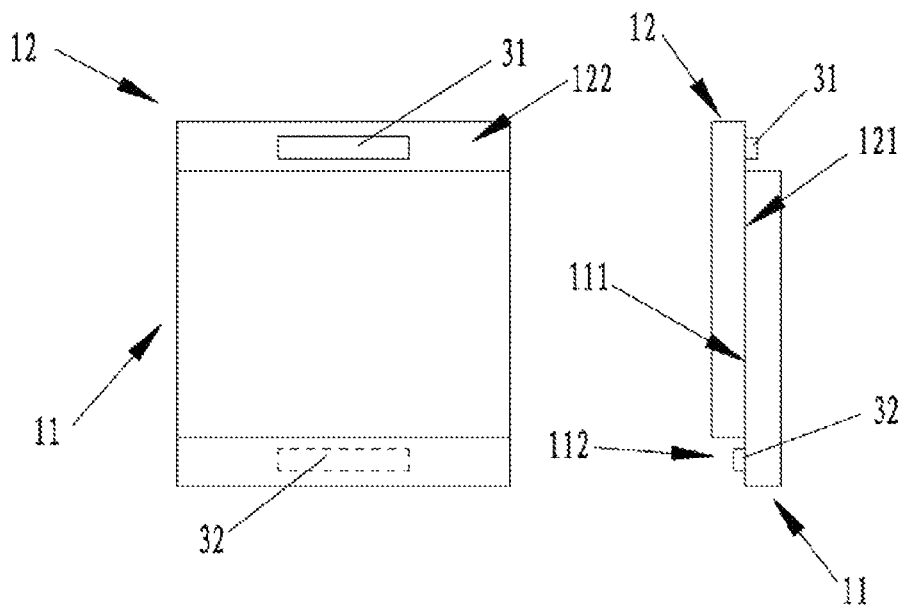
FIG. 4 is a top view showing the adhesion of a color filter substrate to an array substrate according to the first embodiment of the present disclosure.
FIG. 5 is a left view of FIG. 4.

As shown in FIGS. 2, 3 and 4, the touch display panel in this embodiment includes a display panel, a touch layer 20 and a touch driving circuit board 31. The display panel includes an array substrate 11 and a color filter substrate 12 arranged opposite to the array substrate 11 to form a cell. The touch layer 20 is arranged at an outer surface of the color filter substrate 12 away from the array substrate 11. An electrodes 5 (including a transmitting electrode 51 and a sensing electrode 52) at the touch layer 20 is connected to a wire 17 through a conductor 15 penetrating through the color filter substrate 12, and the wire 17 is connected to the touch driving circuit board 31.

The color filter substrate 12 includes the outer surface away from the array substrate 11 and an inner surface facing the array substrate 11.

The color filter substrate 12 includes a base substrate 13 in which a via-hole 14 is provided, and the conductor 15 is connected to the wire 17 through the via hole 14. In addition, the color filter substrate 12 includes a color filter layer 18 proximate to black matrix 16 and below base substrate 13.

One end of the via-hole 14 is arranged opposite to the electrode 5 at the touch layer 20, and the other end is arranged opposite to the black matrix 16 within the color filter substrate 12.

A projection of the wire 17 onto the color filter substrate 12 in a perpendicular direction is located within a projection of the black matrix 16 onto the color filter substrate 12 in a perpendicular direction.

In this embodiment, a grid-like black matrix layer is arranged on the base substrate 13 of the color filter substrate 12. A hole is formed in the color filter substrate 12 through laser drilling and then a conductive material is filled into the hole so as to form the conductor 15 connected to the wire 17. The projection of the wire 17 onto the color filter substrate 12 in a perpendicular direction is located within the projection of the black matrix 16 onto the color filter substrate 12 in a perpendicular direction, and in this way, an aperture ratio of the display panel will not be adversely affected by the wire 17.

Referring to FIG. 5, the touch driving circuit board 31 is located at the inner surface of the color filter substrate 12 facing the array substrate 11, a display driving circuit board 32 of the display panel is arranged on the array substrate 11, and the wire 17 is arranged at the inner surface of the color filter substrate 12. The wire 17 is made of metal, so as to reduce its resistance.

In this embodiment, the color filter substrate 12 and the array substrate 11 are adhered to each other in an offset manner, the inner surface of the color filter substrate 12 includes a first opposing region 121 corresponding to the array substrate 11 and a first non-opposing region 122 offset from the array substrate 11, the touch driving circuit board 31 is arranged at the first non-opposing region 122, the inner surface of the array substrate 11 includes a second opposing region 111 corresponding to the color filter substrate 12 and a second non-opposing region 112 offset from the color filter substrate 12, and the display driving circuit board 32 is arranged at the second non-opposing region 112.

The wire 17 is connected to the touch driving circuit board 31. For example, the wire 17 is connected to a pad which is then connected to the touch driving circuit board 31.

Second Embodiment

Figure 6:
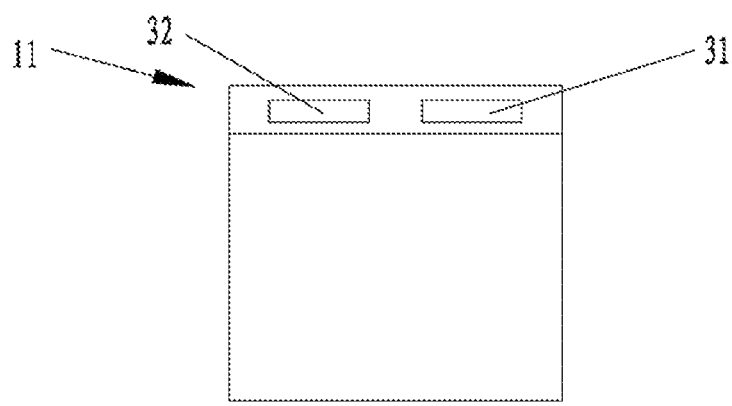
FIG. 6 is a top view showing the adhesion of the color filter substrate to the array substrate according to the second embodiment of the present disclosure.

As shown in FIG. 6, the touch display panel in this embodiment differs from that in the first embodiment in the position where the touch driving circuit board 31 is arranged. In this embodiment, the touch driving circuit board 31 and the display driving circuit board 32 of the display panel are both arranged on the array substrate 11, and the wire 17 is arranged between the color filter substrate 12 and the array substrate 11. The wire 17 is connected to the touch driving circuit board 31 on the array substrate 11. For example, the wire 17 is connected to a gold ball which is then connected to the touch driving circuit board 31.

Third Embodiment

Figure 7:
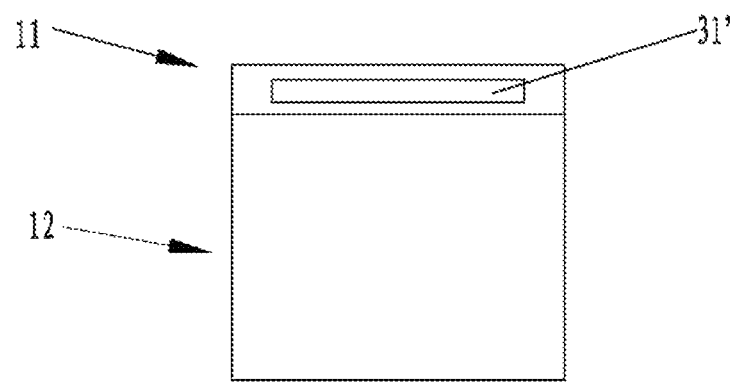
FIG. 7 is a top view showing the adhesion of the color filter substrate to the array substrate according to the third embodiment of the present disclosure.

As shown in FIG. 7, the touch display panel in this embodiment differs from that in the second embodiment merely in that the touch driving circuit board and the display driving circuit board are integrated into a circuit board 31' which is arranged on the array substrate 11.

Fourth Embodiment

Figure 8:
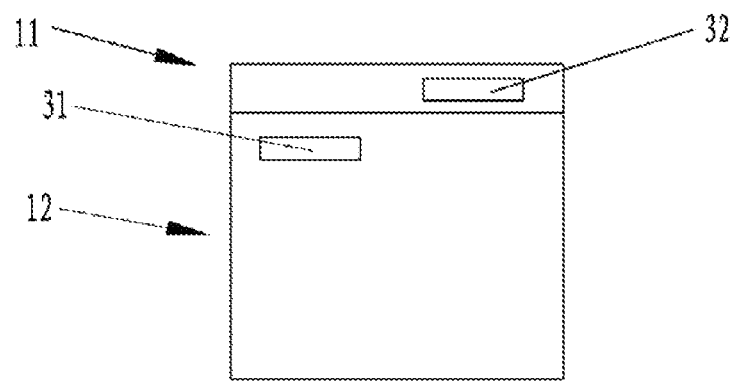
FIG. 8 is a top view showing the adhesion of the color filter substrate to the array substrate according to the fourth embodiment of the present disclosure.

As shown in FIG. 8, the touch display panel in this embodiment differs from that in the first embodiment in that the touch driving circuit board 31 is arranged at the outer surface of the color filter substrate 12 away from the array substrate 11, while the display driving circuit board 32 of the display panel is arranged on the array substrate 11. The wire 17 is arranged between the color filter substrate 12 and the array substrate 11, and connected to the touch driving circuit board 31 on the color filter substrate 12 after penetrating through the color filter substrate 12.

The present disclosure further provides in one embodiment a display device including the above-mentioned touch display panel.

According to the embodiments of the present disclosure, the electrodes 5 (including the transmitting electrode 51 and the sensing electrode 52) at the touch layer 20 are connected to the touch driving circuit board 31 through the conductor 15 penetrating through the color filter substrate 12, and the touch driving circuit board 31 is connected to the electrodes 5 through the metal wires at the inner surface of the color filter substrate 12. In this way, the electrodes and the wires are not arranged at an identical layer and the wires do not gather together, so no touch dead zone occurs at the touch layer 20. In terms of the touch performance, it is able to remarkably improve the touch accuracy due to the absence of touch dead zone.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. An on-cell touch display panel, comprising a display panel, a touch layer arranged on an outermost surface of the display panel and a touch driving circuit board, the display panel comprising an array substrate and a color filter substrate arranged opposite to the array substrate to form a cell, the touch layer containing at least one transmitting electrode and at least one sensing electrode, both the at least one transmitting electrode and the at least one sensing electrode being arranged at an outer surface of the color filter substrate away from the array substrate, the color filter substrate including a base substrate and a color filter layer, wherein each of the at least one transmitting electrode and the at least one sensing electrode at the touch layer is connected to a wire through a conductor penetrating through the base substrate of the color filter substrate, and the wire is connected to the touch driving circuit board.

2. The on-cell touch display panel according to claim 1, wherein a via-hole is provided in the base substrate, and the conductor is connected to the wire through the via-hole.

3. The on-cell touch display panel according to claim 2, wherein one end of the via-hole is arranged opposite to the electrode at the touch layer, and the other end of the via-hole is arranged opposite to a black matrix on the color filter substrate.

4. The on-cell touch display panel according to claim 3, wherein a projection of the wire onto the color filter substrate in a perpendicular direction is located within a projection of the black matrix onto the color filter substrate in a perpendicular direction.

5. The on-cell touch display panel according to claim 3, wherein the touch driving circuit board is arranged at an inner surface of the color filter substrate facing the array substrate, a display driving circuit board of the display panel is arranged on the array substrate, and the wire is arranged at an inner surface of the color filter substrate.

6. The on-cell touch display panel according to claim 3, wherein the wire is a metal wire.

7. The on-cell touch display panel according to claim 2, wherein a projection of the wire onto the color filter substrate in a perpendicular direction is located within a projection of the black matrix onto the color filter substrate in a perpendicular direction.

8. The on-cell touch display panel according to claim 2, wherein the touch driving circuit board is arranged at an inner surface of the color filter substrate facing the array substrate, a display driving circuit board of the display panel is arranged on the array substrate, and the wire is arranged at an inner surface of the color filter substrate.

9. The on-cell touch display panel according to claim 2, wherein the wire is a metal wire.

10. The on-cell touch display panel according to claim 1, wherein a projection of the wire onto the color filter substrate in a perpendicular direction is located within a projection of the black matrix onto the color filter substrate in a perpendicular direction.

11. The on-cell touch display panel according to claim 10, wherein the touch driving circuit board is arranged at an inner surface of the color filter substrate facing the array substrate, a display driving circuit board of the display panel is arranged on the array substrate, and the wire is arranged at an inner surface of the color filter substrate.

12. The on-cell touch display panel according to claim 1, wherein the touch driving circuit board is arranged at an inner surface of the color filter substrate facing the array substrate, a display driving circuit board of the display panel is arranged on the array substrate, and the wire is arranged at an inner surface of the color filter substrate.

13. The on-cell touch display panel according to claim 12, wherein the color filter substrate and the array substrate are adhered to each other in an offset manner, the inner surface of the color filter substrate comprises a first opposing region corresponding to the array substrate and a first non-opposing region offset from the array substrate, the touch driving circuit board is arranged at the first non-opposing region, the inner surface of the array substrate comprises a second opposing region corresponding to the color filter substrate and a second non-opposing region offset from the color filter substrate, and the display driving circuit board is arranged at the second non-opposing region.

14. The on-cell touch display panel according to claim 12, wherein the wire is connected to a pad which is connected to the touch driving circuit board.

15. The on-cell touch display panel according to claim 1, wherein the wire is a metal wire.

16. The on-cell touch display panel according to claim 1, wherein the touch driving circuit board and the display driving circuit board of the display panel are both arranged on the array substrate.

17. The on-cell touch display panel according to claim 16, wherein the wire is connected to a gold ball which is connected to the touch driving circuit board on the array substrate.

18. The on-cell touch display panel according to claim 1, wherein the touch driving circuit board and the display driving circuit board are integrated into a circuit board which is arranged on the array substrate.

19. The on-cell touch display panel according to claim 1, wherein the touch driving circuit board is arranged at the outer surface of the color filter substrate away from the array substrate, the display driving circuit board of the display panel is arranged on the array substrate, and the wire is connected to the touch driving circuit board on the color filter substrate after penetrating through the color filter substrate.

20. A display device comprising an on-cell touch display panel, the touch display panel comprising a display panel, a touch layer arranged on an outermost surface of the display panel and a touch driving circuit board, the display panel comprising an array substrate and a color filter substrate arranged opposite to the array substrate to form a cell, the touch layer containing at least one transmitting electrode and at least one sensing electrode, both the at least one transmitting electrode and the at least one sensing electrode being arranged at an outer surface of the color filter substrate away from the array substrate, the color filter substrate including a base substrate and a color filter layer, wherein each of the at least one transmitting electrode and the at least one sensing electrode at the touch layer is connected to a wire through a conductor penetrating through the base substrate of the color filter substrate, and the wire is connected to the touch driving circuit board.

* * * * *